Oct. 9, 1945. J. N. ROTH Re. 22,680

REFRIGERATOR

Original Filed Jan. 19, 1940 2 Sheets-Sheet 1

Inventor:
Joseph N. Roth,
By Christy, Miles, Davis & Hirschl,
Attys.

Oct. 9, 1945. J. N. ROTH Re. 22,680

REFRIGERATOR

Original Filed Jan. 19, 1940 2 Sheets-Sheet 2

Inventor:
Joseph N. Roth,
By Chritton, Wiles, Davis & Hirschl,
Attys.

Reissued Oct. 9, 1945

Re. 22,680

UNITED STATES PATENT OFFICE 22,680

REFRIGERATOR

Joseph N. Roth, Belding, Mich., assignor, by mesne assignments, to Montcalm, Incorporated, Greenville, Mich., a corporation of Michigan Original No. 2,339,816, dated January 25, 1944, Serial No. 380,343, February 24, 1941, which is a division of Serial No. 314,704, January 19, 1940. Application for reissue January 15, 1945, Serial No. 572,935

12 Claims. (Cl. 62—5)

This invention relates to a refrigerator, and more particularly to an improved control arrangement for a domestic refrigerator.

The present application is a divisional of my application, Serial No. 314,704, filed January 19, 1940, which issued as Patent No. 2,305,640.

Figure 1:
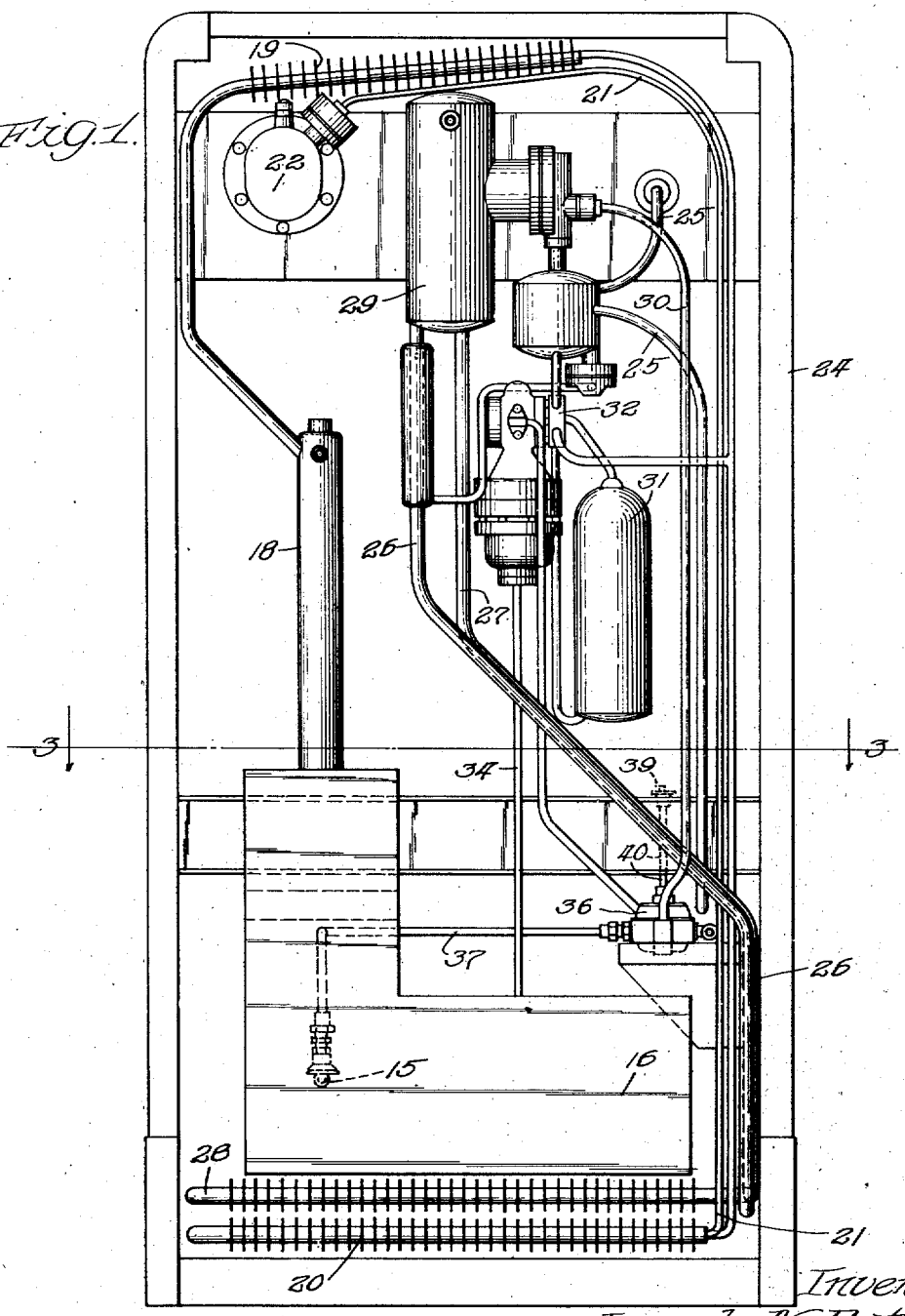
Figure 2:
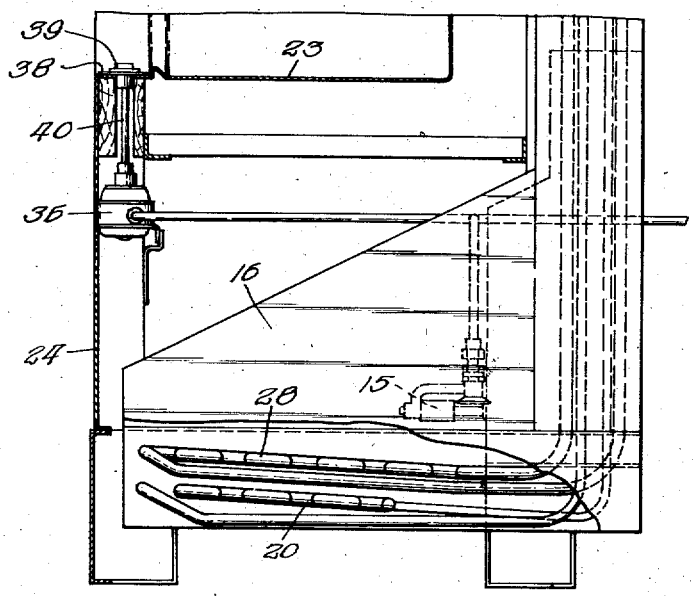
Figure 3:
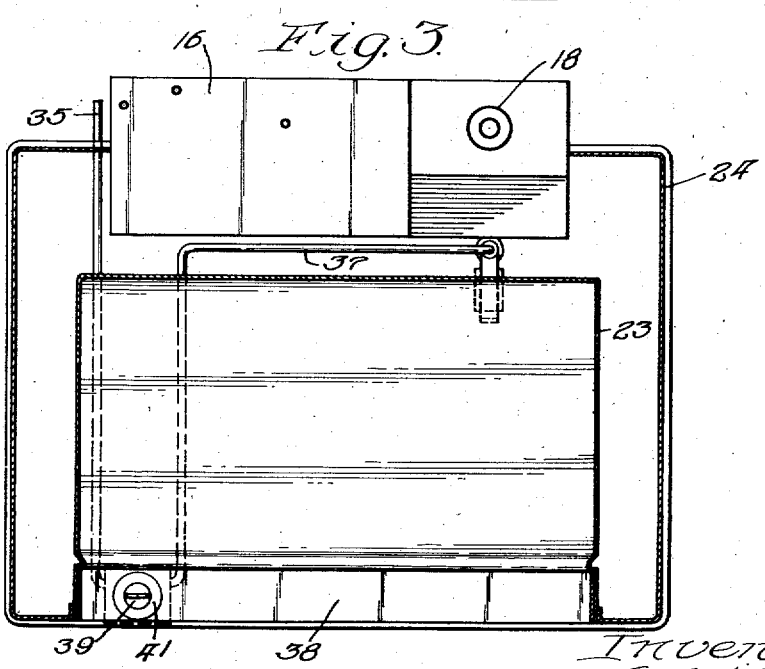

One feature of this invention is that it provides an improved and more convenient location of the manual control associated with control apparatus for varying the amount of refrigeration in a domestic refrigerator; another feature of this invention is that the control apparatus is located in convenient and desirable relationship with the refrigerant circulating apparatus of the refrigerator; yet another feature of this invention is that the control mechanism and control knob are so associated that operative connection between them may be conveniently and simply made; other features and advantages of this invention will be apparent in the following specification and the drawings, in which:

Figure 1 is a back elevational view of a domestic refrigerator embodying my invention, with part of the food compartment broken away to show the control; Figure 2 is a partial vertical sectional view transverse to Figure 1; and Figure 3 is a horizontal sectional view along the line 3—3 of Figure 1.

While my improved control arrangement is adapted for use with any type of refrigerant circulating apparatus, it is here illustrated and described in a domestic refrigerator of the continuous absorption type. The system is based on the type of refrigerating apparatus shown in Schurtz Patent No. 1,414,527, which issued May 2, 1922. The basic system there shown has been considerably modified and improved by said Schurtz and myself to adapt it particularly for domestic refrigerator, and a number of the features and improvements of the refrigerant circulating apparatus and its operation and arrange are the subject of copending applications by the said Schurtz and myself, either jointly or solely. The present application is directed entirely to the location and arrangement of the mechanism for manual control elements for effecting variation in the rate of refrigeration; and the rest of the system will, therefore, be only described briefly.

In the particular embodiment of my invention disclosed herewith the flame from a burner 15 heats a combination of liquid refrigerant and absorbent (as ammonia and water) in a still 16, preferably encased with heat insulating material. The refrigerant vapor boiled off by this application of heat passes up through an analyzer tower 18 and an air-cooled rectifier 19 to condenser coils 20 where it is liquefied. Ammonia liquefied in this condenser is forced up, by the vapor pressure behind it, through the pipe 21 to the receiver 22. A conventional float actuated expansion or pressure reduction valve admits the refrigerant from this receiver to an evaporator located in the food compartment 23 in the upper part of the cabinet 24, where the expansion of the refrigerant vapor absorbs heat in the food compartment and keeps it cold.

The refrigerant vapor, now at low pressure, passes down from the evaporator through pipe 25 to the rising leg 26 of an absorbent-circulating coil comprising the legs 26 and 27 and the finned cooling coil 28 at the bottom of the cabinet adjacent the condenser. This circulating loop is connected to an absorber chamber 29, and operates to dissipate the heat of absorption by circulating the liquid in the absorber down through the cooling coil 28, and by effecting most of the absorption in the rising leg of this cooling loop or circulating path.

In order to return rich liquor from the absorber to the still, and to deliver weak liquor periodically to the absorber, means is provided for circulating refrigerant liquid periodically between the still and the absorber. Inasmuch as the absorber usually operates at a pressure between ten and fifteen pounds and the still at a pressure of ten to twenty times this pressure, no difficulty is occasioned in the movement of the weak liquor from the still to the absorber, this taking place through the pipe 30 and being controlled by a float actuated valve in the absorber. Thus whenever the level of the liquid in the absorber drops, weak liquor moves up from the still. Return of rich liquor from the low pressure portion of the system to the high pressure portion of the system, however, is more difficult; and is accomplished in the general manner taught in the above-mentioned Schurtz patent. The transfer apparatus includes a transfer chamber 31 and transfer valve mechanism 32. A fluid thermostat in the still operates, through liquid in the pipe 34, to effect movement of the transfer valves at desired times. In general, it may be stated that normally the top of the transfer chamber 31 is open to low pressure vapor in the top of the absorber 29, and the bottom of the chamber 31 is connected to a pipe containing liquid, in turn connected to the absorber, so that the transfer chamber fills with rich liquor at low pressure. When the concentration of liquor in the still has boiled down to a predetermined desired minimum the fluid thermostat moves the valves to block the connections of the transfer chamber to the absorber and to connect its top to a pipe containing high pressure vapor, and its bottom to the still. When these connections are effected the liquid in the transfer chamber drains by gravity to the still, and thereupon the valves return to their previous setting and the transfer chamber refills from the absorber. This cycle may, for example, take place about once every seven or eight minutes. It will be thus seen that despite the constant boiling off of refrigerant vapor from the still, and the absorption of such vapor in the absorber, desired quantities and concentrations of liquor are maintained in the various parts of the system.

It is apparent that the rate of boiling off of refrigerant vapor (and thus indirectly the rate of transfer action) is a direct function of the amount of heat suuplied to the still, which is in turn a function of the amount of fuel supplied to the burner. Since the float actuated expansion valve in the receiver 22 will pass refrigerant to the cooling coils at any rate the refrigerant is supplied to the receiver, it will be seen that variation of the rate or amount of refrigeration effect obtained in the food compartment may be attained by variation of the flow of fuel to the burner. I have therefore provided control mechanism for varying the rate of fuel flow and operative mechanism, including a control knob, for varying such rate, the control knob thus varying the amount of refrigeration attained. It is the location and arrangement of this control equipment with which this application is particularly concerned, and which will now be described more fully.

The fuel for the burner 15, preferably gas, is supplied to the refrigerator through the pipe 35. This pipe leads through flow control mechanism 36 to the pipe 37, which then delivers the fuel to the burner. The flow control mechanism 36, in accordance with conventional practice, includes a valve element for regulating the flow and mechanism for moving the valve. Movement of the valve is effected by thermostatic means responsive to the temperature in the food compartment, the amount of movement or position of the valve member for any given food compartment temperature being regulated by manually operable control means associated with the thermostat. Thus the amount of refrigeration, responsive primarily to the thermostatic portion of the control, may be varied by operation of the manual control.

The food compartment is completely open in the front, in accordance with conventional practice, and the opening is surrounded or bordered by border means here shown as a rectangular frame defining the opening, the bottom section of the border means (the bottom member of the frame) being horizontal and here identified as 38. This frame is mounted in the cabinet and adapted to have the refrigerator door received therein to make sealing engagement therewith, to provide the desired closure of the food compartment. While a door frame is shown as a separate element, it will be understood that the opening may be defined by border means comprising the forward portions of the food compartment walls, an inturned portion of the shell, or the like, and that the opening may be closed by a door hung and operative in any conventional manner. In the bottom frame member 38 is mounted a knob or manual control means 39, this being rotatable. The knob 39 is connected to the refrigerator control mechanism 36 by a simple and short connection, the rod 40 extending down through the front end of the insulating wall beneath the food compartment, in this case being shown as extending through a wooden cross piece. Manual rotation of the knob 39 effects adjustment in the control mechanism 36, and therefore varies the amount of refrigeration in accordance with the desire of the operator.

While the control knob is here shown as being mounted to the left side of the bottom frame member, it will be obvious that the advantages of this control assembly and arrangement will be achieved by mounting the control knob anywhere in the bottom horizontal frame member 38. In this position the control member is immediately and easily accessible for manipulation upon opening of the food compartment door. Heretofore control knobs have generally been located alongside the evaporator, either deeply inside the food compartment in a relatively inaccessible place, or sometimes requiring the opening of a second smaller door on the front of the evaporator to gain access to the control knob. Moreover, this location of the control knob in the bottom frame member enables the control mechanism to be immediately adjacent and in convenient relationship to the apparatus in the machinery compartment, where such is beneath the food compartment. This desirable location is attained, moreover, without the necessity of long or complicated connection between the control knob in the upper part of the food compartment and mechanism in the machinery compartment.

As will be apparent from Figure 3, the control knob 39 is encircled with an annular metal indicator plate 41. While the details are not shown here because of the size of the view, this plate will normally bear on it inscriptions indicating which way the knob should be rotated to raise the temperature in the food compartment, and which movement effects a reduction of temperature in the food compartment. There may also be certain arbitrary numbers or symbols on this encircling dial member 41 to enable an instruction booklet to be used wherein instructions are given as to the desired setting of the control knob for certain food preparation, as the freezing of ice cream or the like. The location of the control knob and encircling indicating dial (rigidly mounted) in the bottom frame member is also desirable since it calls them to one's attention each time the refrigerator door is opened. The control knob and encircling indicator dial are preferably of light colored metal or plastic, to contrast with a dark colored door frame.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A refrigerator of the character described, including: a cabinet having a food compartment in the upper part thereof and a machinery compartment in the lower part; an opening in the front of the food compartment; a frame surrounding said opening; a door adapted to fit into the frame to close the opening; refrigerant circulating apparatus; means for controlling the rate of circulation, said means being in the machinery compartment; and regulating means extending from the control means through the bottom portion of the frame and provided with means for manual operation located immediately adjacent said bottom frame portion and accessible only when the door is open.

2. A continuous absorption refrigerator of the character described, including: a cabinet having a food compartment in the upper part thereof and a machinery compartment in the lower part; an opening in the front of the food compartment; a frame surrounding said opening; a door adapted to fit into the frame to close the opening; refrigerant circulating apparatus; means for controlling the rate of flow of fuel to control the rate of circulation, said means being in the machinery compartment; and regulating means extending from the control means through the bottom portion of the frame and provided with means for manual operation located immediately adjacent said bottom frame portion and accessible only when the door is open.

3. A refrigerator of the character described, including: a cabinet having a food compartment in the upper part thereof and a machinery compartment in the lower part; an opening in the front of the food compartment; a frame surrounding said opening and having an approximately horizontal bottom portion; a door adapted to fit into the frame to close the opening; refrigerant circulating apparatus; means for controlling the rate of circulation, said means being in the machinery compartment; and regulating means comprising a rigid shaft extending from the control means through the bottom portion of the frame and provided on its upper end with means for manual operation located immediately adjacent said bottom frame portion and accessible only when the door is open.

4. A continuous absorption refrigerator of the character described, including: a cabinet having a food compartment in the upper part thereof and a machinery compartment in the lower part; an opening in the front of the food compartment; a frame surrounding said opening and having an approximately horizontal bottom portion; a door adapted to fit into the frame to close the opening; refrigerant circulating apparatus; means for controlling the rate of circulation, said means being in the machinery compartment; and regulating means comprising a shaft extending from the control means through said bottom portion and carrying a control knob immediately adjacent and parallel to said bottom frame portion and accessible only when the door is open.

5. Apparatus of the character claimed in claim 4, wherein the knob is of heat insulating material and a heat insulating member encircles the shaft beneath the knob.

6. A refrigerator of the character described, including: a cabinet having a food compartment in the upper part thereof and a machinery compartment in the lower part; an opening in the front of the food compartment defined by border means therearound; a door adapted to close said opening; refrigerant circulating apparatus; means for controlling the rate of circulation, said means being in the machinery compartment; and regulating means extending from the control means through the bottom section of the border means and provided with means for manual operation located immediately adjacent said bottom section and accessible only when the door is open.

7. A refrigerator of the character described, including: a cabinet having a food compartment in the upper part thereof and a machinery compartment in the lower part; an opening in the front of the food compartment defined by border means therearound, said border means having an approximately horizontal bottom section; a door adapted to close said opening; refrigerant circulating apparatus; means for controlling the rate of circulation, said means being in the machinery compartment; and regulating means comprising a rigid shaft extending from the control means through the bottom section of the border means and provided on its upper end with means for manual operation located immediately adjacent said bottom section and accessible only when the door is open.

8. A continuous absorption refrigerator of the character described, including: a cabinet having a food compartment in the upper part thereof and a machinery compartment in the lower part; an opening in the front of the food compartment defined by border means therearound, said border means having an approximately horizontal bottom section; a door adapted to close said opening; refrigerant circulating apparatus; means for controlling the rate of circulation, said means being in the machinery compartment; and regulating means comprising a shaft extending from the control means through said bottom section and carrying a control knob immediately adjacent and parallel to said bottom section and accessible only when the door is open.

9. Apparatus of the character claimed in claim 8, wherein the knob is of heat insulating material and a heat insulating member encircles the shaft beneath the knob.

10. A refrigerator of the character described, including: a cabinet having a food compartment in the upper part thereof with an insulating wall therearound and a machinery compartment in the lower part; an opening in the front of the food compartment; a door adapted to close said opening; refrigerant circulating apparatus; means for controlling the rate of circulation, said means being in the machinery compartment; and regulating means extending from the control means through the front end of the insulating wall beneath the food compartment and provided with means for manual operation located at the bottom of the food compartment immediately adjacent said front opening and accessible only when the door is open.

11. A refrigerator of the character described, including: a cabinet having a food compartment in the upper part thereof with an insulating wall therearound and a machinery compartment having portions beneath and behind said food compartment; an opening in the front of the food compartment; a door adapted to close said opening; refrigerant circulating apparatus; means for controlling the rate of circulation, said means being in a portion of the machinery compartment; and regulating means consisting of rigid connecting means directly extending from the control means through said insulating wall and provided with means for manual operation located at the bottom of the food compartment immediately adjacent said front opening and accessible only when the door is open.

12. A refrigerator of the character described, including: a cabinet having a food compartment in the upper part thereof with an insulating wall therearound and a machinery compartment having portions beneath and behind said food compartment; an opening in the front of the food compartment; a door adapted to close said opening; refrigerant circulating apparatus; means for controlling the rate of circulation, said means being in a portion of the machinery compartment; and regulating means extending from the control means through said insulating wall and provided with means for manual operation located in the bottom of the food compartment immediately adjacent said front opening and accessible only when the door is open.

JOSEPH N. ROTH.